United States Patent
Natsume (10) Patent No.: US 7,693,627 B2
(45) Date of Patent: Apr. 6, 2010

(54) TIRE CONDITION NOTIFICATION APPARATUS

(75) Inventor: Wataru Natsume, Kariya (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 12/007,393

(22) Filed: Jan. 10, 2008

(65) Prior Publication Data

US 2008/0172151 A1    Jul. 17, 2008

(30) Foreign Application Priority Data

Jan. 15, 2007    (JP)    ............... 2007-005877

(51) Int. Cl.
  *G06F 19/00*    (2006.01)
(52) U.S. Cl. ............... 701/30; 701/1; 701/29; 340/425.5; 340/438; 340/441; 340/442; 340/444
(58) Field of Classification Search ............ 701/30
  See application file for complete search history.

(56) References Cited

U.S. PATENT DOCUMENTS

| | | | | |
|---|---|---|---|---|
| 4,931,930 | A * | 6/1990 | Shyu et al. ............ | 701/36 |
| 5,576,956 | A * | 11/1996 | Ashizawa et al. ........ | 701/42 |
| 5,576,959 | A * | 11/1996 | Hrovat et al. ........... | 701/70 |
| 6,112,147 | A * | 8/2000 | Ghoneim et al. ......... | 701/80 |
| 6,823,245 | B2 * | 11/2004 | Sugitani et al. ......... | 701/29 |
| 7,103,461 | B2 * | 9/2006 | Iwazaki et al. .......... | 701/41 |
| 7,356,396 | B2 * | 4/2008 | Mori et al. ............. | 701/41 |
| 7,417,531 | B2 * | 8/2008 | Obradovich ............ | 340/426.33 |

FOREIGN PATENT DOCUMENTS

| | | |
|---|---|---|
| JP | UA-S57-113275 | 7/1982 |
| JP | U-60-189473 | 12/1985 |
| JP | A-61-013106 | 1/1986 |
| JP | A-216266 | 8/1992 |
| JP | U-5-16558 | 3/1993 |
| JP | A-06-251145 | 9/1994 |
| JP | A-06-316275 | 11/1994 |
| JP | A-08-080865 | 3/1996 |
| JP | A-09-022410 | 1/1997 |
| JP | A-10-218007 | 8/1998 |
| JP | A-2004-224090 | 8/2004 |
| JP | A-2004-314862 | 11/2004 |
| JP | A-2007-112360 | 5/2007 |

OTHER PUBLICATIONS

Office Action dated Sep. 9, 2008 in corresponding Japanese patent application No. 2007-005877 (and English translation).

* cited by examiner

*Primary Examiner*—Khoi Tran
*Assistant Examiner*—Jonathan Sample
(74) *Attorney, Agent, or Firm*—Posz Law Group, PLC

(57) ABSTRACT

A tire steer condition detection and notification apparatus calculates a tire steer angle based on a steering wheel operation when a parked condition of a vehicle is detected, and provides a notification (i.e., warning) regarding a tire steer condition when the tire steer angle is equal to or greater than a predetermined angle. Further, when the vehicle is determined to be in the parked condition and has a predicted travel course diverted away from a road shape based on the tire steer angle at the time, the tire steer condition detection apparatus provides a notification (i.e., warning) regarding the tire steer condition.

18 Claims, 7 Drawing Sheets

TIRE CONDITION NOTIFICATION APPARATUS

CROSS REFERENCE TO RELATED APPLICATION

This application is based on and claims the benefit of priority of Japanese Patent Application No. 2007-5877 filed on Jan. 15, 2007, the disclosure of which is incorporated herein by reference.

FIELD OF THE INVENTION

The present invention generally relates to a tire condition notification apparatus for use in a vehicle.

BACKGROUND INFORMATION

A situation described in the following may help ordinary people understand a background of the present invention. That is, for example, let us consider that a user intends to park his or her vehicle at an intended location in a parking area. The user carefully steers a steering wheel so as not to contact the vehicle with the other vehicles around it or obstacles such as road facilities including a wall and a pillar. The user may need to repeatedly K-turn or pull over to a curb. The user repeatedly drives the vehicle forward and backward and may be at a loss to understand how much the steering wheel is rotated or whether the tires are directed to the right or left. In such a case, the vehicle may move to an unintended direction and collide with an obstacle.

In consideration for such situation, for example, Japanese Patent Document JP-A-1996-80865 (referred to as Patent Document 1 hereinafter) discloses a front tire steering angle indication apparatus that uses a needle to indicate a front tire steering angle corresponding to a steering wheel operation. The apparatus is built in a dashboard at a driver's seat and always indicates the front tire steering angle.

Using that apparatus, the user can relatively easily determine the amount of steering wheel operation to park the vehicle at an intended place.

Even when the user uses the apparatus to successfully park or stop the vehicle, an unexpected accident may occur when the vehicle starts the next time depending on a condition of tires steered to park the vehicle.

Figure 1A:
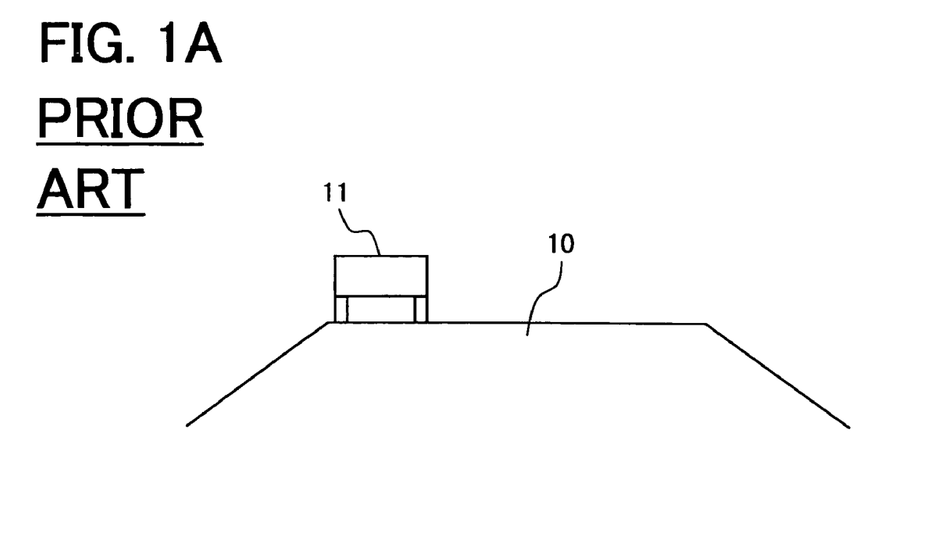
FIGS. 1A and 1B show diagrams of a typical situation addressed by the present invention.
Figure 1B:
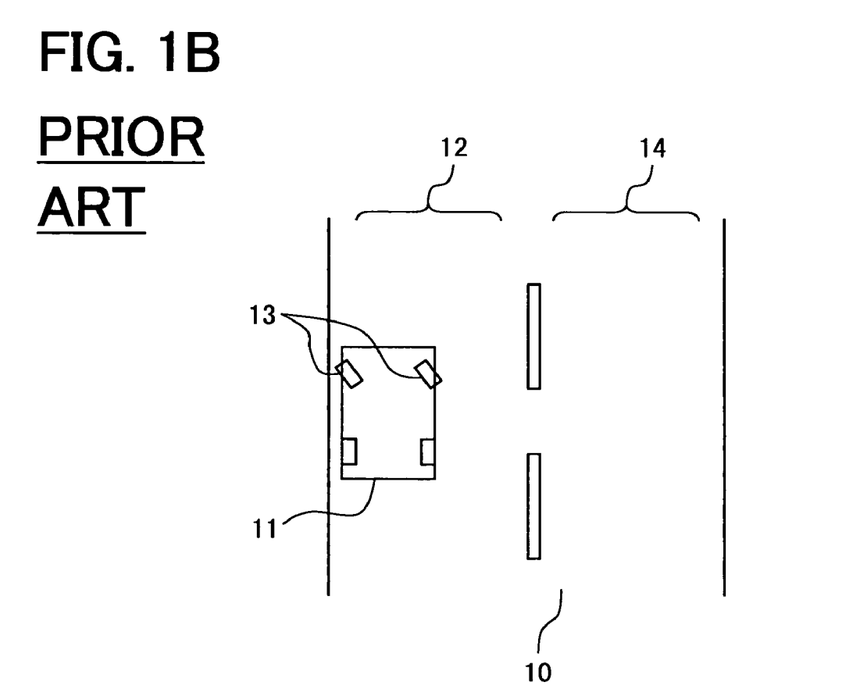

As an example, a vehicle 11 may be parked at the end of a road 10 whose cross sectional view is convex as shown in FIG. 1A. FIG. 1B is a top view of the vehicle 11 parked at the end of a lane 12 of the road 10. FIG. 1B assumes that the user parks the vehicle by leaving the steering wheel turned to the left against a traveling direction. When restarting the vehicle, the user may forget correcting the condition of the steering wheel (or a tire 13). The tire 13 may move as steered and sidetrack because it is not positioned straight along the traveling direction. In the worst case, the vehicle may fall from the road.

On the contrary, the user may park the vehicle by leaving the steering wheel turned to the right. When the user inadvertently restarts the vehicle without correcting the condition of the steering wheel, the vehicle may collide with a vehicle coming in the opposite direction on an opposite lane 14 or with another vehicle catching up from behind on the lane 12.

As another example, the user may wait for the traffic light to change and forget turning the steering wheel to the right or left. After the traffic light changes, the user may restart the vehicle without correcting the steering wheel, causing the same accident as mentioned above. The above description obviously applies to driving on not only the left-hand side but also the right-hand side depending on traffic regulations of the subject country.

The apparatus according to Patent Document 1 simply always displays the steering condition of tires despite the above-mentioned situations. The apparatus does not notify whether or not the user needs to pay attention to a steering condition of tires of the stopped vehicle next time the vehicle restarts. Even though the apparatus of Patent Document 1 allows the user to recognize the tire steering condition, the user needs to determine the condition at the time of restarting the vehicle based on his or her experience or intuition. Even when a vehicle uses the apparatus of Patent Document 1, the user may forget confirming the tire steering condition. The user cannot be aware of the condition at the time of restarting the vehicle.

The user may forget a steering condition of tires of the stopped vehicle and restart the vehicle to cause an unsafe condition. The apparatus in Patent Document 1 cannot notify the user that the tires are not steered in a proper direction. In other words, that apparatus cannot provide the necessary notification at a timing needed for the user when the vehicle stops or restarts.

SUMMARY OF THE INVENTION

The present invention has been made in consideration of the foregoing. It is therefore an object of the present invention to provide a tire condition notification apparatus capable of notifying a tire steering condition at a timing appropriate to a user when an attempt is made to stop or restart a vehicle.

To solve the above-mentioned problem, a tire condition notification apparatus of the present invention includes a parking condition detection unit, a tire steering condition detection unit, and a notification unit. The parking condition detection unit detects that a vehicle is parked. The tire steering condition detection unit detects the vehicle's tire steering condition based on the amount of steering wheel operation by a user. When the parking condition detection unit detects that the vehicle is parked, the notification unit notifies a user of the detected tire steering condition considered to be a specified unsafe condition.

The tire condition notification apparatus detects parking of a vehicle based on a brake system operating condition for parking and a gear position of the vehicle transmission. The tire condition notification apparatus notifies a user of the tire steering condition when it matches the specified unsafe condition that allows the steering condition to be considered unsafe as predefined. The following effects are available. When notified of the tire steering condition, the user can recognize it, operate the steering wheel, correct the steering condition considered unsafe, and park or resume parking the vehicle. Since the vehicle is parked in this way, the tire condition notification apparatus can prevent the vehicle from restarting toward an unintended direction even when the user forgets the tire steering condition immediately before the parking. The tire condition notification apparatus can notify the user of the tire steering condition at a timing needed for the user and help him or her safely start the vehicle.

The above-mentioned construction takes effect when the vehicle is parked or the parked vehicle restarts. The specified unsafe condition is considered to take effect for notifying the tire steering condition when this condition (steering angle) satisfies a predetermined condition, i.e., greater than or equal to a specified angle with reference to the condition of not steering the tire. However, the user stops or starts the vehicle on a road that may or may not be shaped uniformly. Let us suppose that the user stops the vehicle with the tires left to be steered on a curved road, for example. The steering condition may not be unsafe when it matches the road condition. On the contrary, the unsteered tires may conflict with the road condition. In the event of collision, the vehicle may sidetrack or contact with a vehicle coming in the opposite direction. Nonetheless, the construction of apparatus automatically notifies a tire steering angle greater than or equal to a specified angle and insufficiently embodies the object of the invention. Such construction may annoy the user. To solve this problem, a tire condition notification apparatus further includes a current location acquisition unit, a stop condition detection unit, a storage unit, a tire steering condition detection unit, and a notification unit. The current location acquisition unit acquires a vehicle's current location. The stop condition detection unit detects the vehicle's stop condition based on a vehicle speed. The storage unit stores road data. The tire steering condition detection unit detects the vehicle's tire steering condition based on the amount of steering wheel operation by a user. When the stop condition detection unit detects the stop condition of the vehicle, the notification unit determines whether or not the tire steering condition matches the specified unsafe condition, based on the road data at the acquired current location and the detected tire steering condition. The notification unit notifies the tire steering condition when the tire steering condition matches the specified unsafe condition.

The tire condition notification apparatus detects the stop of the vehicle and notifies the vehicle's steering condition based on the relationship between road data at the current vehicle location and the tire steering condition. The following effects are available. Depending on road conditions indicated by the road data, the tire condition notification apparatus provides no notification even when the tire is steered. On the contrary, the tire condition notification apparatus provides notification when the tire is not steered. Based on the notification, the user can confirm the tire steering condition and determine whether or not the tire steering condition matches the road condition. When stopping or starting the vehicle, the user can correct the tire steering condition so as to match the road condition. The tire condition notification apparatus can notify the tire steering condition at a timing needed for the user and help him or her safely stop or stop the vehicle.

BRIEF DESCRIPTION OF THE DRAWINGS

Other objects, features and advantages of the present invention will become more apparent from the following detailed description made with reference to the accompanying drawings, in which.

DETAILED DESCRIPTION

The following describes embodiments of the invention applied to an onboard navigation system installed in a vehicle with reference to the accompanying drawings. Though, in the following, the left side traffic is assumed due to the traffic regulations in the country where the present invention is conceived, the right side traffic can none the less be accommodated only by switching the right-left relationships in the description and drawing.

Figure 2:
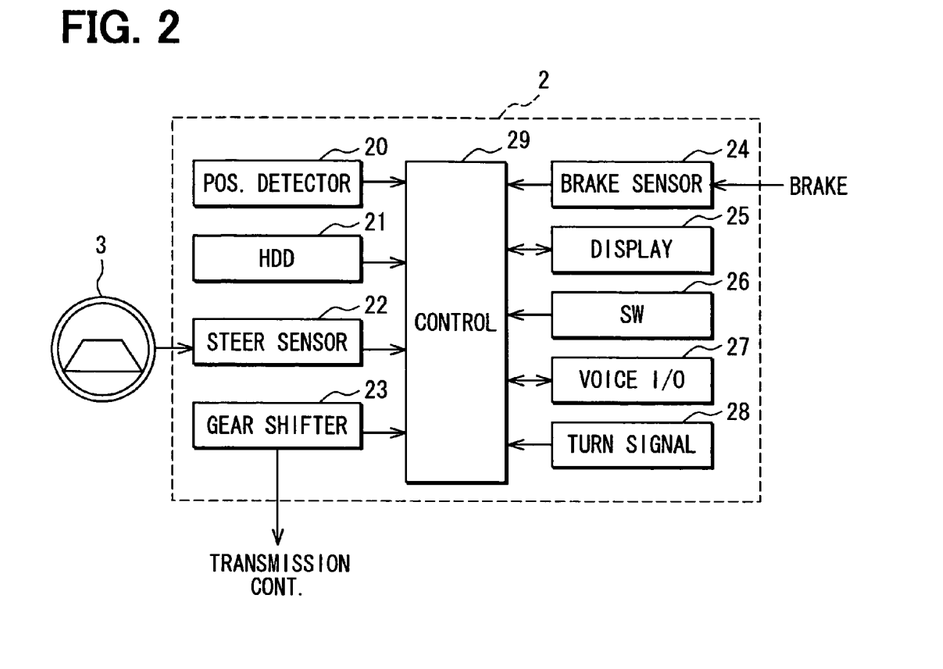
FIG. 2 shows a block diagram of an onboard navigation apparatus of the present invention.

FIG. 2 is a block diagram schematically showing an onboard navigation system provided with the vehicle condition notification apparatus according to the invention. An onboard navigation apparatus 2 includes the following connected with each other. A position detector 20 detects a current vehicle position. A Hard Disk Drive (HDD) device 21 integrates a storage medium for storing map data with a data input device for reading the map data. A steering sensor 22 acquires angle information, i.e., the quantity of user operation on a steering wheel 3 and detects a tire steering condition. A gear position change device 23 accepts a user instruction to change a gear position, allows a transmission (not shown) to change the gear position according to the instruction, and inputs information about the gear position. A brake sensor 24 detects an operation condition of a brake system. A display unit 25 provides a user with various indications. An operation switch group 26 accepts user's operation instructions. A voice input/output unit 27 includes, though not shown, a speaker, a microphone, and a speech recognition system. Though not shown, a VICS (Vehicle Information and Communication System described later in detail) receiver is provided. A turn signal lamp 28 notifies the other drivers that a user intends to turn the vehicle to the right or left. A control unit 29 controls these components.

The position detector 20 includes, though not shown, a vehicle speed sensor, a gyroscope, and a GPS receiver. The vehicle speed sensor generates a pulse corresponding to a tire rotation and measures pulses to detect a vehicle's running speed. The gyroscope detects the vehicle's rotational movement. The GPS receiver receives a radio wave from an artificial satellite for GPS (Global Positioning System). The position detector 20 supplies the control unit 29 with detection signals from the above-mentioned elements. The control unit 29 receives the signals and calculates and determines the vehicle's mileage, current position, and traveling orientation.

The map data stored in the HDD device 21 contains node data associated with latitude and longitude information, road data (vector data) called link data, cost data, road facility data, and speech recognition data for guidance. The cost data is used to calculate a guide route from a specified current vehicle position to a user-specified destination.

The link data contains road link data (road links) corresponding to roads. A road link is associated with such information as a road gradient, the road's latitude and longitude, and a road type. The gradient information indicates ups and downs of a road and contains data of height changes with reference to a given horizontal distance. The latitude and longitude information is a set of coordinate data. Specifically, the road link is a set of small segments corresponding to the latitude and longitude information. A road shape to be described is calculated by assuming its small segment to be part of an arc or to be part of an arc whose curvature radius is very large when the small segment is straight. The road types include general road, express highway, and toll road corresponding to road links.

The steering sensor 22 is preferably a rotary encoder provided in interlock with the steering wheel 3. When the user operates the steering wheel 3, the steering sensor 22 generates a corresponding pulse signal or code signal to detect the amount of rotation of the steering wheel 3 as an electric signal and supplies the signal to the control unit 29. Normally, the steering wheel has a play that refrains tires from being steered despite the user's operation on the steering wheel. The play causes allowance for the tire steering and prevents unintended abrupt steering. The invention always takes into consideration a predetermined value corresponding to the play as an offset for an electric signal from the rotary encoder.

Figure 3:
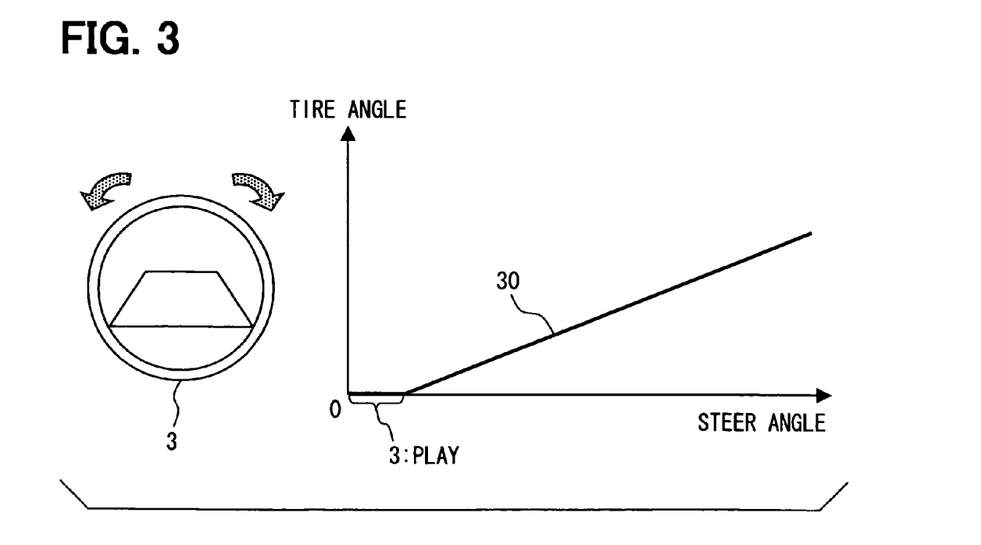
FIG. 3 shows a diagram of a relationship between an operation angle of a steering wheel and a tire steering angle.

FIG. 3 shows relationship between the amount of steering wheel operation and a tire steering angle. When the user operates the steering wheel 3 so as to steer the tire clockwise or counterclockwise, a tire steering angle (absolute value) varies with a steering angle (absolute value) of the steering wheel 3 in accordance with a steering angle characteristic 30. The zero point corresponds to a value for starting operating the steering wheel 3. This value indicates a condition where neither the steering wheel nor the tire is operated and the tire's rotation axis is perpendicular to a vehicle's longitudinal direction. For a while after starting an operation of the steering wheel 3, the operation does not steer the tire until the amount of steering operation reaches an angle corresponding to the play. The control unit 29 calculates a tire steering angle based on an electric signal corresponding to the amount of operation to rotate the steering wheel 3 and the characteristic showing the relationship between the steering operation and the tire steering angle. The electric signal is supplied from the steering sensor 22. It is possible to more accurately detect a steering condition (steering angle) of the tire. The HDD device 21 stores values for the tire steering angle (predetermined value) and curvature radii needed for a steering condition notification operation to be described later.

The gear position change device 23 is equivalent to a gear shift lever and is mounted, for example, near a driver's seat where the user can easily reach in a vehicle compartment. The gear position change device 23 accepts a user's operation to change the gear position and transmits a signal corresponding to the changed gear position to a connected transmission control system (not shown) and the control unit 29. When receiving the signal, the transmission control system allows the transmission to change the current gear position to the one corresponding to the received signal. For example, let us suppose that the user uses the gear position change device 23 to change the gear position from a drive (D) range to a neutral (N) range on an automatic transmission vehicle (hereafter referred to as an at vehicle). The gear position change device 23 transmits a signal corresponding to the N range to the transmission control system and the control unit 29. The transmission control system allows the transmission to change the gear position from the D range to the N range. When the user changes the gear position from the first (i.e., low) to the second on a manual transmission vehicle, the transmission control system similarly changes the gear position from the first to the second.

The brake sensor 24 is equivalent to a parking brake sensor that detects an operation condition of a brake system (parking brake system). The brake sensor 24 supplies the control unit 29 with an electric signal indicating whether or not the brake system operates.

The display unit 25 includes a liquid crystal display or an organic electroluminescence display and can provide the user with various visual information. For example, the display unit 25 can display a symbol mark indicating a present location and a guide route from the present location to a destination so that they overlap with each other. The present location depends on the vehicle's current position detected by the position detector 20 and map data supplied from the HDD device 21. The display unit 25 may be integrated with a speed meter of the vehicle or may be equivalent to a windshield display to be optically projected on a windshield.

The operation switch group 26 includes a mechanical switch (hard switch) provided for an instrument panel in the vehicle compartment or a touch switch integrated with the display unit 25. The operation switch group 26 accepts various operation instructions from the user and supplies the accepted instruction as a signal to the control unit 29. The operation switch group 26 may be provided for a remote control terminal (not shown). A sensor (not shown) may be used to receive a radio wave from the remote control terminal and receive an instruction from the user.

The voice input/output unit 27 generates the speech for audibly guiding facilities in the map data or providing various notifications from a speaker. In addition, the voice input/output unit 27 allows the speech recognition system to recognize the user's speech input from the microphone, converts the speech into an electric signal, and supplies it to the control unit 29. The voice input/output unit 27 enables the user to control the system by inputting his or her voice from the microphone.

The VICS receiver acquires traffic information from a VICS information center via an optical beacon or a radio beacon installed at the roadside and supplies the traffic information to the control unit 29. In this case, "VICS" represents Vehicle Information and Communication System operated in Japan.

The turn signal lamp 28 also signifies a hazard warning signal flasher. When turning to the right or left or changing the lane, the user can use the turn signal lamp 28 to notify the other drivers of his or her intention for safe driving. The turn signal lamp 28 transmits a signal corresponding to the user's instruction to the control unit 29. For example, the user's instruction is to turn to the right or left or to turn on the hazard warning signal flasher.

The control unit 29 mainly represents a microcomputer including peripheral ROM (Read Only Memory) and RAM (Random Access Memory) connected to a CPU (Central Processing Unit) via a bus line. The control unit 29 reads input signals from the above-mentioned elements and a program stored in the ROM to the RAM for performing various processes. The control unit 29 also contains an internal clock (not shown). An oscillation phenomenon occurs when a voltage is applied to a crystal oscillator. The internal clock converts the oscillation phenomenon into a cyclic electric signal and measures the signal to implement timing. The control unit 29 also functions as an accurate clock by periodically correcting the timing based on time information acquired by the GPS receiver.

The following describes operations of the control unit 29 according to the invention with reference to working examples.

FIRST WORKING EXAMPLE

The working example (i.e., an embodiment of the invention) describes operations for notifying the user of a tire steering condition and a steering wheel condition when the vehicle is parked or starts from the parked condition. The working example assumes that the user parks the vehicle at a proper location and restarts from there. This will be described with reference to flowcharts and diagrams in FIGS. 4 through 6.

(Parking Operation)

Figure 4:
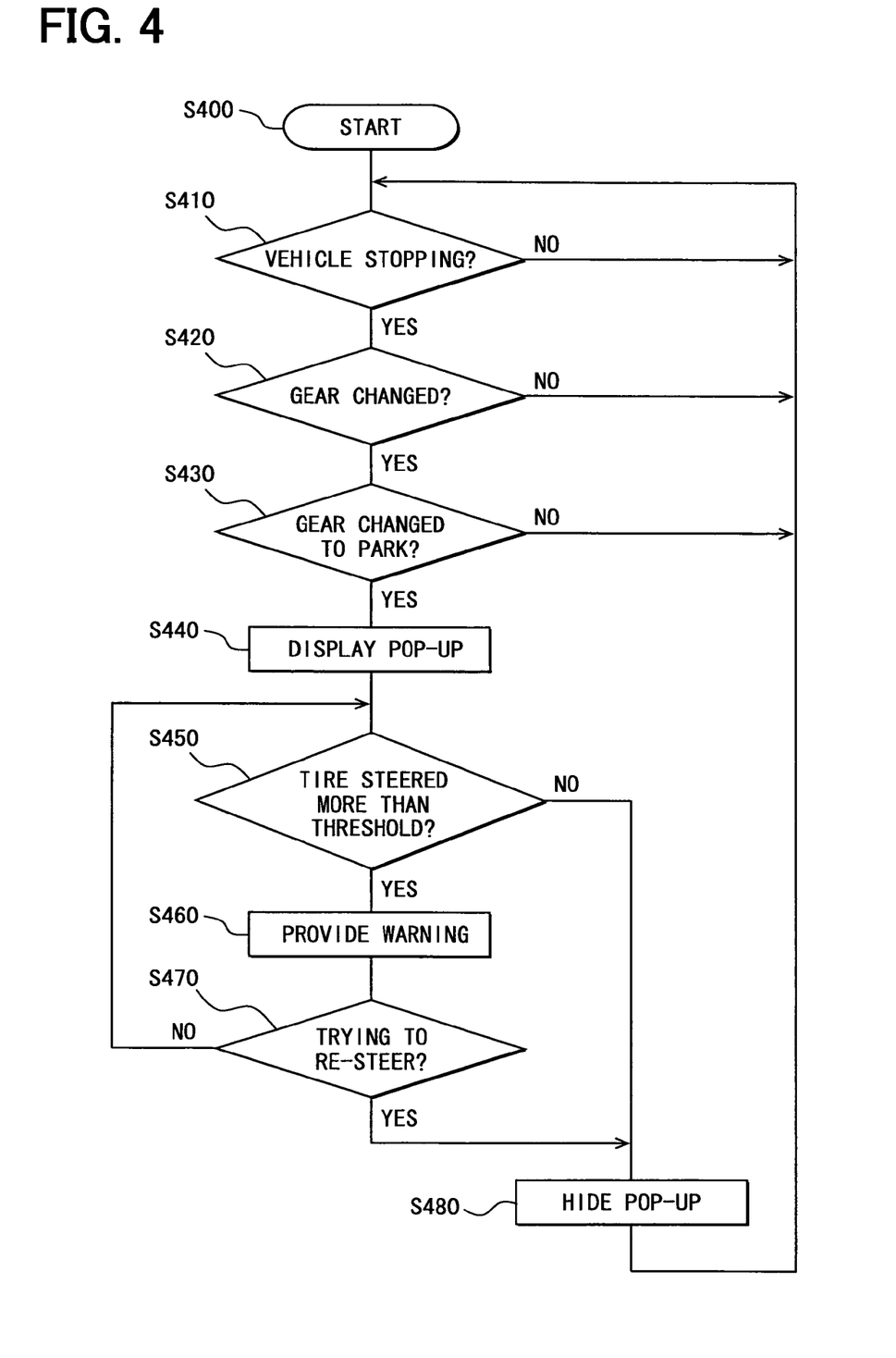
FIG. 4 shows a flowchart of a process for steering wheel operation condition notification in an embodiment of the present invention.

FIG. 4 is a flowchart showing an operation of notifying a steering wheel operation condition and a tire steering condition when the vehicle is parked. At Step S400, the operation starts when the user starts a drive source of the vehicle or turns on an accessory. Turning on the accessory supplies power to the onboard navigation apparatus 2 without starting the vehicle's drive source.

After starting the operation, the control unit 29 proceeds to Step S410 and determines whether or not the vehicle stops, i.e., the vehicle speed sensor detects speed zero. The control unit 29 proceeds to Step S420 when determining that the vehicle stops (YES at Step S410). When the vehicle does not stop (NO at Step S410), the control unit 29 waits until the vehicle stops.

At Step S420, the control unit 29 determines whether or not the user changes a gear position for parking. Specifically, the control unit 29 determines whether or not the user changes the gear position to the P (parking) range for an AT (Automatic Transmission) vehicle or to the first (low) or R (reverse) gear for an MT (Manual Transmission) vehicle. To determine this, the control unit 29 receives a signal corresponding to the gear position from the gear position change device 23. The control unit 29 proceeds to Step S430 when the user changes the gear position for parking (YES at Step S420). The control unit 29 waits until the gear position is changed when the user has not changed the gear position (NO at Step S420).

At Step S430, the control unit 29 determines whether or not the user operates a parking brake to park the vehicle. To do this, the control unit 29 determines whether or not to receive a signal indicating the condition of operated parking brake from the brake sensor 24. When it is determined at Step S430 that the user operates the parking brake (YES at Step S430), the control unit 29 determines that the vehicle is parked. The control unit 29 then proceeds to Step S440. On the contrary, the control unit 29 returns to Step S410 when the user does not operate the parking brake (NO at Step S430). This step is required for the MT vehicle but may be unnecessary for the AT vehicle. It is obvious that an AT vehicle user changes the gear position to the P range only when parking the vehicle. The operation at Steps S410 and S430 can reliably determine whether or not the vehicle is parked.

At Step S430, the control unit 29 allows the display unit 25 to display information for notifying the user of the tire steering condition. Specifically, the steering sensor 22 supplies an electric signal indicating a rotation angle of the steering wheel 3. The control unit 29 calculates a steering angle from the electric signal and the steering characteristic 30 in FIG. 3 based on a normal tire condition where the tire is not steered with reference to the vehicle and causes the steering angle to be zero. The control unit 29 allows the display unit 25 to display the tire steering condition based on the calculated steering angle.

Figure 5A:
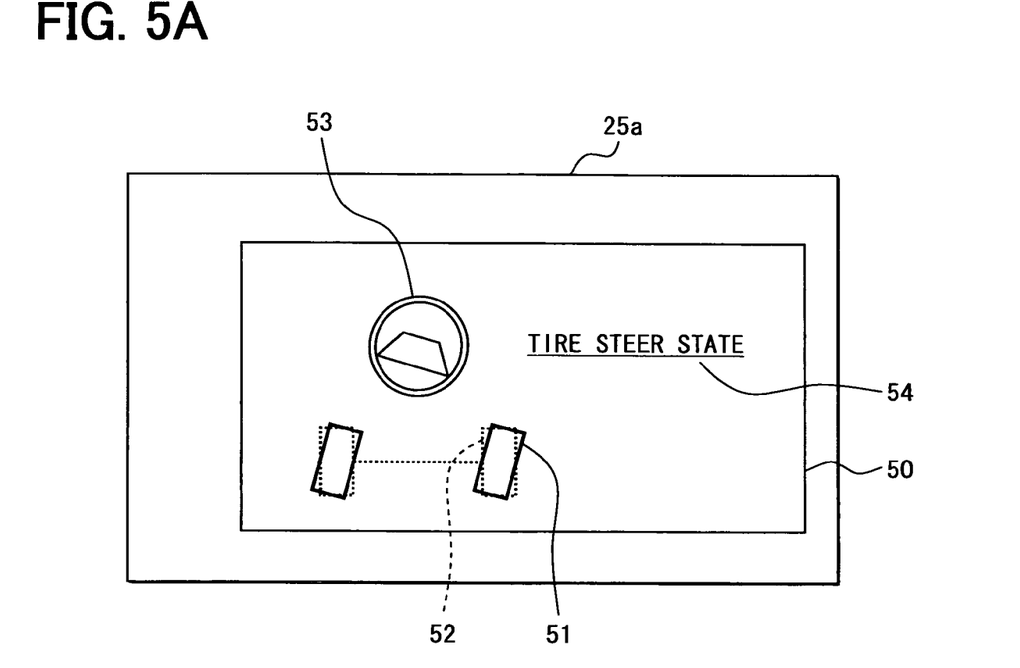
FIGS. 5A and 5B show illustrations of tire steering condition display screen in an embodiment of the present invention

As shown in FIG. 5A, for example, the tire steering condition is displayed in a pop-up screen 50 of a display screen 25a. In more detail, the pop-up screen 50 in FIG. 5A schematically shows a top view of tire steer condition of the vehicle from a point of view of a user who is facing vehicle frontward. The control unit 29 allows the display unit 25 to display the current tire steering condition (thick line 51 in the drawing) based on the calculated steering angle and the normal condition (dotted line 52 in the drawing) in comparison with each other. It is more preferable to display an image 53 and descriptive text 54 such as "steer state" or the like. The image 53 schematically shows the steering wheel corresponding to its steering angle detected by the steering sensor 22.

When parking the vehicle, the user can recognize at a glance how much the tire steering condition (thick line 51) differs from the normal condition (dotted line 52).

At Step S450, the control unit 29 determines whether or not the tire steering angle calculated at Step S440 is greater than or equal to a predetermined angle (threshold value) based on absolute values. The threshold value for the steering angle ranges from several to tens of degrees equivalent to the steering angle in the normal condition and is stored in the HDD device 21 in advance. The control unit 29 proceeds to Step S460 when the calculated steering angle is greater than or equal to the threshold value (YES at Step S450). The control unit 29 provides a warning notifying that the tire is steered to be in a predetermined dangerous condition. The control unit 29 then proceeds to Step S470. When the steering angle is smaller than the threshold value (NO at Step S450), the control unit 29 proceeds to Step S480, hides the pop-up screen 50, and returns to Step S410.

Figure 5B:
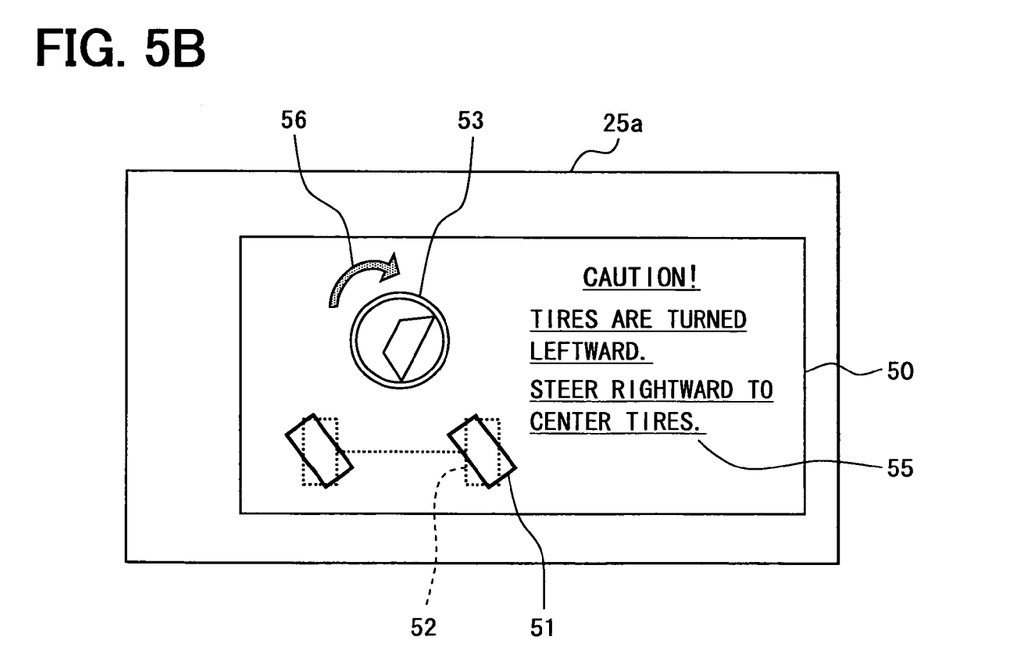

The warning at Step S460 is not limited to the indication of the tire steering condition at Step S430 in FIG. 5A. As shown in FIG. 5B, for example, the warning is also provided as a warning message 55 indicating the current tire steering condition such as "Caution! The tires are directed to the left. Operate the steering wheel to center the tires." Further, an arrow 56 is displayed to indicate a steering direction so that the steering condition is restored to normal. Moreover, a speech notification is provided from the speaker.

The control unit 29 allows the user to easily notice that the vehicle is parked with the steering wheel being rotated at an angle greater than or equal to the specified threshold value and that the tires are not steered normally. The user can restore the tire condition to normal. It is possible to prevent the vehicle from being parked with the tires being steered excessively. The control unit 29 prompts the user to park the vehicle by appropriately steering the tires. The control unit 29 can prevent the vehicle from restarting toward an unintended direction even though the user forgets the tire steering condition immediately before the parking. The control unit 29 can notify the tire steering condition at a timing needed for the user and help the user safely start the vehicle.

At Step S470, the control unit 29 determines in accordance with the warning at Step S460 whether or not the user releases the parking condition of the vehicle and attempts to steer the tires to the normal condition. To do this, the control unit 29 determines whether or not the vehicle's gear position is changed to one other than the position determined at Step S420 or whether or not the parking brake determined to be operated at Step S430 is released.

It may be determined at Step S470 that the vehicle's gear position is changed or the parking brake is released (YES at Step S470). In this case, the user is assumed to recognize the warning and adjust the tire steering condition. The control unit 29 proceeds to Step S480, hides the pop-up screen 50, and returns to Step S410.

Otherwise (NO at Step S470), the control unit 29 returns to Step S450 and continues to display the warning.

As mentioned above, the pop-up screen 50 may be hidden (Step S480) when Step S450 results in NO or Step S470 results in YES. However, the user may want to steer the tires by viewing the pop-up screen 50. The pop-up screen 50 may be continuously displayed after Step S440 and may be hidden in accordance with a user's instruction.

The parking operation shown in the flowchart terminates when the user stops the vehicle's drive source, turns off the accessory, or stops supplying power to the onboard navigation apparatus 2. When terminating the operation, the control unit 29 stores data such as the tire steering angle calculated immediately before termination of the operation and the amount of operation of the steering wheel 3 in the HDD device 21 or flash memory. The flash memory is contained in the control unit 29 and stores data even after the power is turned off.

The data storage process is important when the parked vehicle is restarted to perform an operation for notifying the user of the tire steering condition, i.e., an operation for restarting the parked vehicle to be described later. The onboard navigation apparatus 2 may be de-energized while the warning is provided at Step S460. It may be more preferable to leave the warning displayed in the screen of the display unit 25 for a while (approximately ten seconds measured by a timing means) without immediately stopping the operation. There has been described the operation for parking the vehicle.

(Operation for Restarting the Parked Vehicle)

Figure 6:
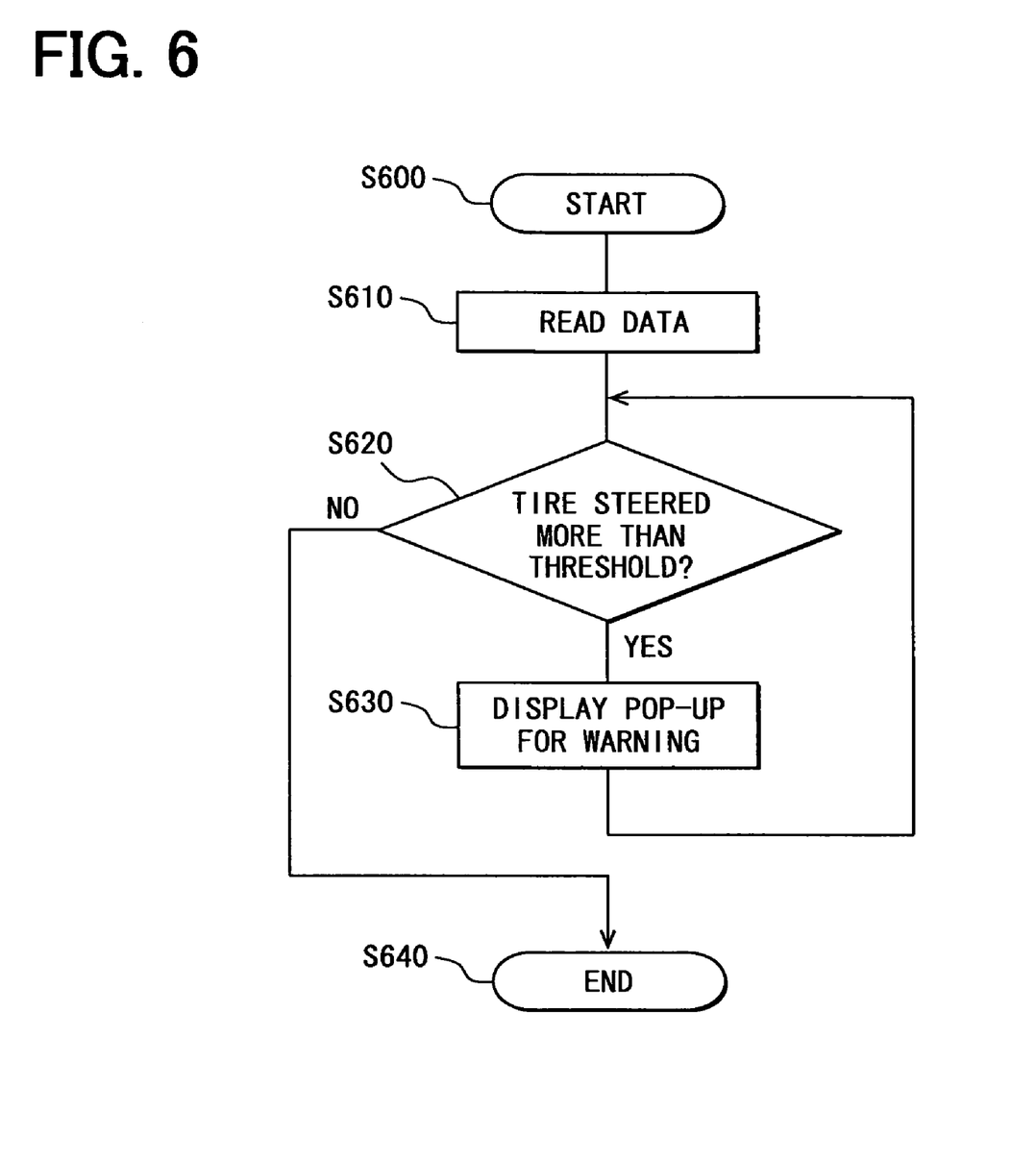
FIG. 6 shows a flowchart of a process in a control unit in an embodiment of the present invention.

The following describes an operation for restarting the parked vehicle with reference to the accompanying drawings. FIG. 6 is a flowchart showing the operation of the control unit 29.

An initiation of the flowchart in FIG. 6 (Step S600) is the same as that in FIG. 4 (Step S400).

At Step S610, the control unit 29 reads data such as the tire steering angle and the steering angle of the steering wheel 3 from the HDD device 21. The data is stored when the vehicle is parked. The control unit 29 then proceeds to Step S620.

At Step S620, the control unit 29 determines whether or not the read tire steering angle is greater than or equal to the threshold value (the predetermined steering angle). When the tire steering angle is greater than or equal to the threshold value (YES at Step S620), the control unit 29 displays the screen 50 as shown in FIG. 5B (Step S630). The control unit 29 warns that the tires are excessively steered in comparison with the normal condition. When the tire steering angle is smaller than the threshold value (NO at Step S620), the control unit 29 proceeds to Step S640 and terminates the operation.

In a possible situation, the user parks the vehicle by leaving the steering wheel turned at a specified angle or larger. The user fails to correct the tire steering condition due to urgency, for example, even though the control unit 29 warns of a specified dangerous condition of the tire steering at Step S460 in FIGS. 5A and 5B. The user de-energizes the onboard navigation apparatus 2 and leaves the vehicle. The user may forget the tire steering condition of the parked vehicle next time he or she attempts to restart the vehicle. In such a case, energizing the onboard navigation apparatus 2 notifies the tire steering condition when it is dangerous. Notified of this information, the user can easily recognize the tire steering condition and restore the tires to the normal condition when restarting the vehicle next time. It is possible to prevent the vehicle from starting with the tires left to be excessively steered. In other words, the parked vehicle can restart without being directed toward an unintended direction even though the user forgets the tire steering condition immediately before the parking. There has been described the operation for restarting the parked vehicle.

SECOND WORKING EXAMPLE

The first working example assumes that a vehicle is parked and the parked vehicle is restarted. The invention is not limited thereto and can be applied when a vehicle is stopped in general and the stopped vehicle is restarted. The second working example will describe an operation of the control unit 29 that notifies the user of the tire steering condition and the steering wheel condition when the vehicle is stopped, not parked, and the stopped vehicle restarts. The working example assumes that the user stops the vehicle by excessively steering the tires with reference to road curvature while waiting for the traffic light to change or getting stuck in traffic and restarts the stopped vehicle. In this case, no unsafe condition may arise depending on road conditions even when the tire steering condition exceeds a specified threshold value assumed in the first working example. On the contrary, when the user stops the vehicle without steering the tires, the vehicle may depart from the lane and contact a vehicle coming in the opposite direction or may sidetrack to a road shoulder due to an unexpected accident such as collision. On such occasion, the automatic notification is inappropriate and may annoy the user only because the notification condition in the working example 1 or the condition to activate Step S460 in FIG. 4 is satisfied. The following working example describes the operation of the control unit 29 so as to notify the user at a timing appropriate or necessary for the user that the tires are excessively steered with reference to a road condition.

(Operation for Stopping the Vehicle and Restarting the Stopped Vehicle)

Figure 7:
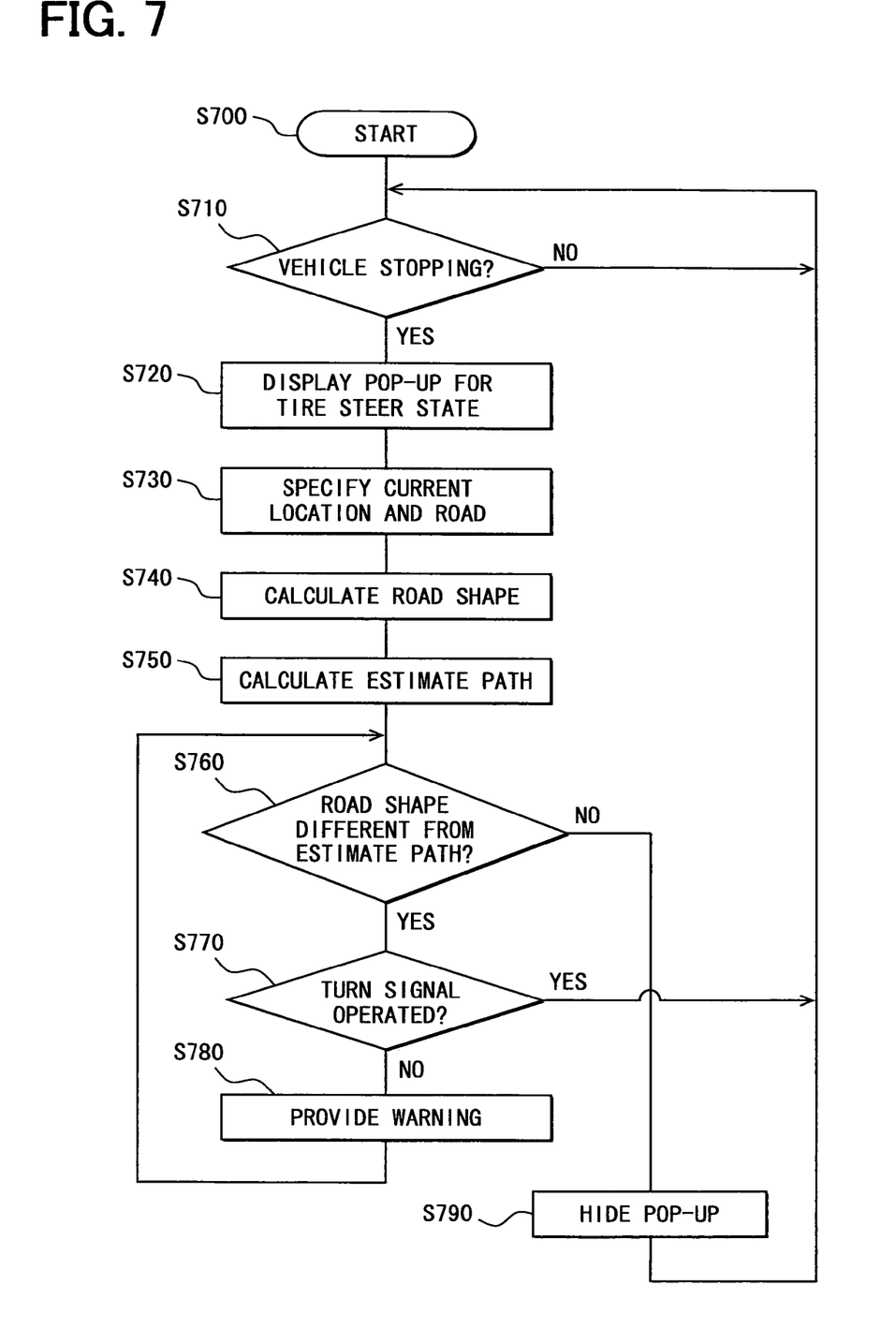
FIG. 7 shows a flowchart of a process for steering wheel operation condition notification in another embodiment of the present invention.

FIG. 7 is a flowchart showing an operation for notifying a steering wheel condition when the vehicle stops and the stopped vehicle restarts. An initiation of the flowchart at Step S700 in FIG. 7 is the same as that at Step S400 in FIG. 4.

The control unit 29 starts the operation at Step S700 and then proceeds to Step S710 to determine whether or not the vehicle stops. Specifically, the control unit 29 determines whether or not the vehicle speed sensor detects the vehicle speed zero. When the vehicle stops (YES at Step S710), the control unit 29 proceeds to Step S720. When the vehicle does not stop (NO at Step S710), the control unit 29 waits until the vehicle stops.

At Step S720, the control unit 29 displays the pop-up screen 50 for indicating the tire steering condition in the display screen 25a of the display unit 25 as shown in FIG. 5A. This step is similar to Step S440 of the flowchart in FIG. 4.

At Step S730, the control unit 29 references the current vehicle location specified by an input from the position detector 20 and the road data read from the HDD device 21 and specifies a road where the vehicle is currently running.

At Step S740, the control unit 29 references road shape data associated with link data equivalent to the road specified at Step S730 and acquires a road shape (road shape pattern) around the current vehicle location. For example, the road shape is a set of two-dimensional curve patterns calculated from latitude and longitude information.

At Step S750, the control unit 29 calculates an estimated vehicular swept path estimated from the tire steering angle that is calculated based on the input from the steering sensor 22. The estimated vehicular swept path is a two-dimensional curve pattern expected to be formed by the vehicle when it runs by keeping the tire steering angle unchanged. Determining the tire steering angle uniquely determines the estimated vehicular swept path. When the tire steering angle is determined, for example, the estimated vehicular swept path can be calculated as well as the other vehicle information such as a vehicle width, a wheel base, and a difference between the radii of turns followed by the front and rear inner or outer tires.

At Step S760, the control unit 29 determines whether or not the tire steering condition is unsafe with reference to the condition or curvature of the road where the vehicle is currently located. That is, the step is to determine whether or not restarting the stopped vehicle without changing the steering condition causes the vehicle to sidetrack or collide with a vehicle coming in the opposite direction. To do this, the control unit 29 compares the road shape acquired at Step S740 with the estimated vehicular swept path calculated at Step S750 and determines whether or not both are in an allowable range.

Figure 8A:
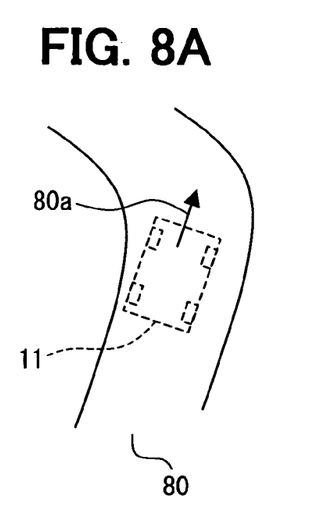
FIGS. 8A and 8B show illustrations of tire steering condition of a vehicle on a curved road in another embodiment of the present invention.
Figure 8B:
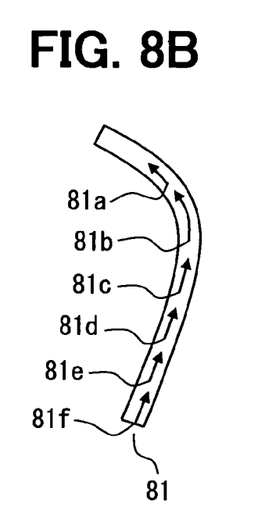

The following describes Steps S740 through S760 in detail with reference to FIGS. 8A and 8B. FIG. 8A is a top view of a vehicle 11 (broken line) stopping on a curved road 80 (dotted line) with the tires left to be approximately normal. Since the tires are hardly steered, the estimated vehicular swept path 80a calculated at Step S750 is approximately straight or an arc whose curvature radius is very large. FIG. 8B shows road link data 81 (shaded) stored in the HDD device 21 correspondingly to the road 80. Arcs 81a through 81f represent a road shape of the road 80 calculated at Step S740.

At Step S760, the control unit 29 compares the condition (arc 81b) of the road for the currently located vehicle with the estimated vehicular swept path 80a. More specifically, the control unit 29 compares the curvature radius of the estimated vehicular swept path 80a with the curvature radius of the arc 81b that is included in the road shape pattern of the road link data 81 and corresponds to the current vehicle location. The control unit 29 determines whether or not the curvature radius of the estimated vehicular swept path 80a is in a specified numeric range (range of curvature radii) defined as a program with reference to the curvature radius of the arc 81b. The numeric range includes ranges of curvature radii for the upper and lower bounds with reference to the curvature radius of the arc 81b as a center value. The HDD device 21 previously stores the ranges of curvature radii for the upper and lower bounds as predetermined values.

At Step S760, the control unit 29 may determine that the curvature radius of the estimated vehicular swept path is outside the specified range (NO at Step S760). In this case, the tire steering condition does not match the road condition. It is determined that the vehicle may sidetrack or collide with a vehicle coming in the opposite direction. The tire steering condition is assumed to be equivalent to a specified unsafe condition. The control unit 29 proceeds to Step S770 to determine whether or not the warning is needed. When the curvature radius is determined to be in the specified range (YES at Step S760), the control unit 29 hides the pop-up screen 50 (Step S790) and returns to Step S710.

Depending on a road condition (road shape) indicated by the road data, the notification (i.e., warning) at Step S780 is not provided even when the tires are steered. On the contrary, the notification can be provided when the tires are not steered. The notification about the tire steering condition does not annoy the user and can be provided at a necessary timing.

Figure 9:
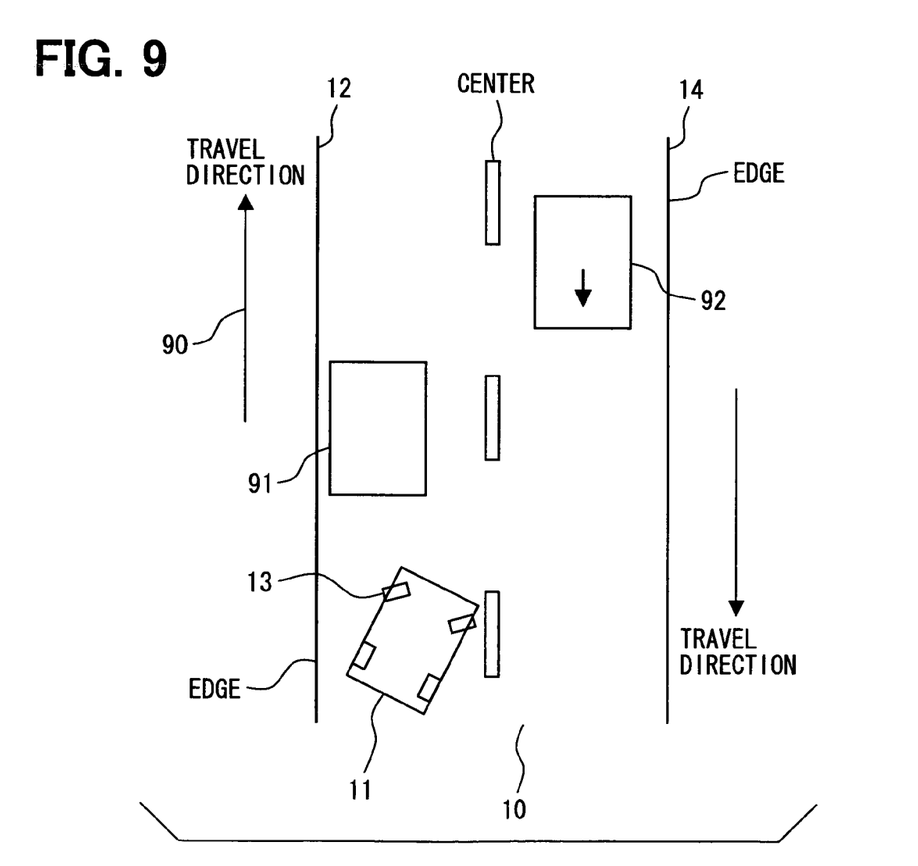
FIG. 9 shows an illustration of a situation for a vehicle in traffic on a straight road in another embodiment of the present invention.

At Step S770, the control unit 29 determines whether or not the user operates the turn signal lamp 28. This step is provided to make clear whether or not the user intentionally deviates the tire steering condition from the road shape or, as assumed in the invention, unintentionally does the same. As shown in FIG. 9, the vehicle 11 encounters a parked vehicle 91 ahead while running on the lane 12 of the road 10 in the direction of an arrow 90. To pass the parked vehicle 91, the user operates the turn signal lamp 28, rotates the steering wheel clockwise, and stops until a vehicle 92 running on an opposite lane 14 passes over. Step S770 determines whether or not this situation occurs. In this example, the shape of the road 10 excessively differs from the estimated vehicular swept path calculated from the steering condition of the tire 13 because the user intends to avoid the parked vehicle 91. The user operates the turn signal lamp 28 and pays attention to the surrounding traffic. Nonetheless, the notification (i.e., warning) of the tire steering condition at Step S780 seems to be not only unnecessary but also annoying to the user. For this reason, the control unit 29 determines at Step S770 whether or not the turn signal lamp 28 operates to indicate that the user intends to drive the vehicle in the direction corresponding to the steered tire. That is, the control unit 29 determines whether or not the tire steering direction matches the running direction indicated by the turn signal lamp 28. When the tire steering direction matches the running direction indicated by the turn signal lamp 28 (YES at Step S770), the control unit 29 returns to Step S760 assuming that the road shape differs from the estimated vehicular swept path because the user intentionally steers the tire. When the hazard warning signal flasher operates (flashes), the control unit 29 also returns to Step S760 assuming that the user intentionally steers the tire clockwise or counterclockwise. In this manner, the control unit 29 prevents the tire steering condition from being notified at a timing unnecessary for the user.

On the other hand, when the tire steering direction differs from the direction indicated by the turn signal lamp 28, or the turn signal lamp 28 is inactive in the first place (NO at Step S770), the control unit 29 assumes that the estimated vehicular swept path (tire steering condition) excessively differs from the road shape. The control unit 29 proceeds to Step S780, provides the warning similar to that at Step S460 in the flowchart of FIG. 4, and returns to Step S710 (through NO at Step S760). That is, the warning operation continues until the tire steering condition is corrected or the turn signal lamp 28 is operated properly.

In this manner, it is possible to determine whether the vehicular swept path estimated from the stopped tire steering condition differs from the road shape with or without the user's intention. The control unit 29 can notify that the tire steering condition differs from the road shape at a necessary timing, i.e., when the user stops the vehicle with the tire steering condition inadvertently left to be different from the road shape. The user can receive the notification, correct the tire steering condition, stop or carefully start the vehicle.

Once the vehicle stops, the control unit 29 can determine whether the tire steering condition differs from the road shape against the user intention and starting the vehicle causes an unsafe condition of sidetracking or colliding with a vehicle coming in the opposite direction. The control unit 29 provides the warning when the danger is assumed to arise. The user can receive the warning, easily recognize an unintended difference between the tire steering condition and the road shape, and correct the tire steering condition. The control unit 29 continues providing the warning until the tire steering condition is corrected. Even when restarting the stopped vehicle, the user can recognize an unintended difference between the tire steering condition and the road shape and drive the vehicle in consideration for the surrounding traffic and road conditions.

When the vehicle stops (YES at Step S710), the control unit 29 immediately displays the pop-up screen 50 (Step S720). Further, the user can control the operation switch group 26 in advance to always hide the pop-up screen 50. This is because displaying the pop-up screen 50 may annoy the user each time the vehicle stops due to traffic congestion. However, it is preferable to display the warning screen displayed due to the negative result of the determination at Step S770, i.e., the pop-up screen 50 displayed at Step S780 even when this screen is intentionally hidden as mentioned above. The warning screen needs to be displayed for safety. In this manner, the user can receive necessary information, i.e., an excessive difference between the tire steering condition and the road shape and avoid annoying display from the display unit 25.

The above-mentioned working example determines whether or not the stopped tire steering condition is unsafe with reference to the road shape. To do this, the control unit 29 determines whether or not the curvature radius of the vehicle's estimated vehicular swept path belongs to the allowable curvature radius range, i.e., the range of curvature radii for the upper and lower bounds. More preferably, the effect of the working example can be improved in accordance with stop places or curvature radii of the road shape by varying the ranges of curvature radii for the upper and lower bounds (range threshold values).

That is, for example, the following scheme may improve the effect of the invention. Because a straight road shape shows a relatively large curvature radius, i.e., a curvature radius larger than or equal to a specified value, and a curved road shape shows a relatively small curvature radius, i.e., a curvature radius smaller than a specified value, the value range of the upper and lower bounds for the curved road shape is configured to be smaller than that for the straight road shape. That is, steering the tires just a little provides no warning when the vehicle stops on a straight road. This is because the steering operation falls within the predetermined range. Slightly steering the tires provides the warning when the vehicle stops on a curved road. This is because the steering operation exceeds the predetermined range. In FIG. 8B, the range of allowable curvature radii for the arc 81*b* is configured to be narrower than those for the arcs 81*a*, 81*c*, 81*d*, 81*e*, and 81*f*. No warning is provided when the range covers a curvature radius for the estimated vehicular swept path.

The curved road requires a stricter condition for the warning (a condition for acknowledging Step S760) than the straight road. The user can more intuitively correct a steering error on the straight road than on the curved road. In this manner, tire steering conditions can be notified to the user in accordance with road shapes. Based on the notification, the user can stop and start the vehicle with an appropriate tire steering condition in accordance with various road shapes. Consequently, the invention can help the user safely stop and start the vehicle.

Other Embodiments

Although the present invention has been fully described in connection with the preferred embodiment thereof with reference to the accompanying drawings, it is to be noted that various changes and modifications will become apparent to those skilled in the art.

For example, the road shape may be calculated based on not only road data as mentioned above but also a road image captured by a camera.

Further, a drive recorder camera in the vehicle compartment is used to recognize a road separation line, e.g., feature points of a white or yellow line. An approximate road shape may be estimated from the separation line or a series of feature points. The estimated approximate road shape is divided into fine arcs. A curvature radius is found for each of the arcs. This makes it possible to calculate the road shape more approximate to an actual shape.

Furthermore, while the road shape is calculated based on road data as mentioned above, the control unit may acquire the road shape by reading road shape data previously stored in the HDD device. This eliminates the need for calculating the road shape from the road data each time the vehicle stops, further accelerating a processing speed.

Such changes and modifications are to be understood as being within the scope of the present invention as defined by the appended claims.

What is claimed is:

1. A tire condition notification apparatus comprising:
   a current position detector that detects a current position of a vehicle;
   a stop condition detector that detects that the vehicle is in a stopped condition based on a detection of a vehicle speed;
   a storage that stores road data;
   a tire steer condition detector that detects a tire steer condition of the vehicle based on an amount of steering operation of a steering wheel by a user; and
   a notifier that provides a notification of the tire steer condition, wherein, when the stopped condition of the vehicle is detected by the stop condition detector, the notifier determines whether the tire steer condition is in a predetermined unsafe condition, and wherein the notifier provides the notification of the tire steer condition upon determining that the tire steer condition is in the predetermined unsafe condition.

2. The apparatus of claim 1,
   wherein the notifier acquires a road shape based on the road data of the detected current position of the vehicle,
   the notifier predicts a predicted course of the vehicle from the current position based on the detected tire steer condition, and
   the notifier provides for the user the notification of the tire steer condition upon determining that the tire steer condition is in the predetermined unsafe condition based on the road shape and the predicted course fulfilling a predetermined relationship.

3. The apparatus of claim 2,
   wherein the predetermined relationship indicates that a curvature radius of the predicted course has a diversion range diverts from a curvature radius of the road shape at least by a predetermined value.

4. The apparatus of claim 3,
   wherein the predetermined value of the diversion range is determined in proportion to the curvature radius of the road shape.

5. The apparatus of claim 1 further comprising:
   a turn signal operation detector that determines a turn signal is in operation for indicating a turn direction that agrees with the predicted course,
   wherein, when the turn signal operation detector is in operation for indicating a turn direction that agrees with the predicted course, the notifier does not provide the notification of the tire steer condition.

6. The apparatus of claim 1,
   wherein the tire steer condition is detected as a tire steer angle from a tire condition that has a tire rotation axis put substantially perpendicularly to a front-rear direction of the vehicle.

7. The apparatus of claim 6,
wherein the tire steer condition detector calculates and acquires the tire steer angle based on a play in the steering operation of the steering wheel.

8. The apparatus of claim 1, wherein
a camera for acquiring a road image is provided in place of the storage, and
the road shape calculated based on the road image is used as the road data.

9. The apparatus of claim 2 further comprising:
a turn signal operation detector that determines a turn signal is in operation for indicating a turn direction that agrees with the predicted course,
wherein, when the turn signal operation detector is in operation for indicating a turn direction that agrees with the predicted course, the notifier does not provide the notification of the tire steer condition.

10. The apparatus of claim 3 further comprising:
a turn signal operation detector that determines a turn signal is in operation for indicating a turn direction that agrees with the predicted course,
wherein, when the turn signal operation detector is in operation for indicating a turn direction that agrees with the predicted course, the notifier does not provide the notification of the tire steer condition.

11. The apparatus of claim 4 further comprising:
a turn signal operation detector that determines a turn signal is in operation for indicating a turn direction that agrees with the predicted course,
wherein, when the turn signal operation detector is in operation for indicating a turn direction that agrees with the predicted course, the notifier does not provide the notification of the tire steer condition.

12. The apparatus of claim 2,
wherein the tire steer condition is detected as a tire steer angle from a tire condition that has a tire rotation axis put substantially perpendicularly to a front-rear direction of the vehicle.

13. The apparatus of claim 3,
wherein the tire steer condition is detected as a tire steer angle from a tire condition that has a tire rotation axis put substantially perpendicularly to a front-rear direction of the vehicle.

14. The apparatus of claim 4,
wherein the tire steer condition is detected as a tire steer angle from a tire condition that has a tire rotation axis put substantially perpendicularly to a front-rear direction of the vehicle.

15. The apparatus of claim 5,
wherein the tire steer condition is detected as a tire steer angle from a tire condition that has a tire rotation axis put substantially perpendicularly to a front-rear direction of the vehicle.

16. The apparatus of claim 9,
wherein the tire steer condition is detected as a tire steer angle from a tire condition that has a tire rotation axis put substantially perpendicularly to a front-rear direction of the vehicle.

17. The apparatus of claim 10,
wherein the tire steer condition is detected as a tire steer angle from a tire condition that has a tire rotation axis put substantially perpendicularly to a front-rear direction of the vehicle.

18. The apparatus of claim 11,
wherein the tire steer condition is detected as a tire steer angle from a tire condition that has a tire rotation axis put substantially perpendicularly to a front-rear direction of the vehicle.

* * * * *